United States Patent
Rotem et al.

(10) Patent No.: US 11,514,306 B1
(45) Date of Patent: Nov. 29, 2022

(54) STATIC MEMORY ALLOCATION IN NEURAL NETWORKS

(71) Applicant: Meta Platforms, Inc., Menlo Park, CA (US)

(72) Inventors: Nadav Rotem, Santa Clara, CA (US); Abdulkadir Utku Diril, Menlo Park, CA (US); Mikhail Smelyanskiy, Burlingame, CA (US); Jong Soo Park, Mountain View, CA (US); Saleem Abdulrasool, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1296 days.

(21) Appl. No.: 15/920,487

(22) Filed: Mar. 14, 2018

(51) Int. Cl.
*G06N 3/08* (2006.01)
*G06N 3/04* (2006.01)
*G06F 3/06* (2006.01)

(52) U.S. Cl.
CPC ............... *G06N 3/08* (2013.01); *G06F 3/064* (2013.01); *G06F 3/0604* (2013.01); *G06F 3/067* (2013.01); *G06N 3/0454* (2013.01)

(58) Field of Classification Search
CPC ...... G06N 3/08; G06N 3/0454; G06F 3/0604; G06F 3/064; G06F 3/067
USPC .............................................. 706/25, 26, 27
See application file for complete search history.

(56) References Cited

U.S. PATENT DOCUMENTS

| | | | | |
|---|---|---|---|---|
| 6,239,803 B1* | 5/2001 | Driskell | ................ | G06F 3/0482 715/810 |
| 6,331,956 B1* | 12/2001 | Ooishi | ................ | G11C 29/842 365/230.03 |
| 2017/0032246 A1* | 2/2017 | Knittel | .................. | G06N 3/084 |
| 2018/0314940 A1* | 11/2018 | Kundu | ................ | G06N 3/0454 |
| 2018/0322607 A1* | 11/2018 | Mellempudi | ........ | G06N 3/0454 |
| 2019/0244058 A1* | 8/2019 | Franca-Neto | .......... | G06V 10/94 |
| 2019/0244086 A1* | 8/2019 | Franca-Neto | ........ | G06N 3/0445 |
| 2020/0279349 A1* | 9/2020 | Nurvitadhi | .......... | G06F 12/0888 |
| 2020/0364823 A1* | 11/2020 | Ould-Ahmed-Vall | | G06F 9/30014 |
| 2021/0110508 A1* | 4/2021 | Mellempudi | ........... | G06F 17/16 |
| 2021/0373886 A1* | 12/2021 | Nealis | ................... | G06F 9/3001 |
| 2022/0019431 A1* | 1/2022 | Kaul | ..................... | G06F 9/3851 |

* cited by examiner

*Primary Examiner* — Thuy N Pardo
(74) *Attorney, Agent, or Firm* — FisherBroyles, LLP

(57) ABSTRACT

The disclosed computer-implemented method may include compiling a neural network, and the compiling may include organizing an interconnected set of nodes in a series of layers, and for each node in each layer, assigning an associated activation of a plurality of activations. Each activation may output a respective tensor of a plurality of tensors. The compiling may also include allocating memory for the activations by determining a respective memory size for each activation, and based on the respective memory size for each activation, assigning a memory block in the neural network to the activation. The method may also include, after the allocating the memory for the activations, accessing the memory blocks to perform the plurality of activations and thereby execute the neural network. Various other methods, systems, and computer-readable media are also disclosed.

20 Claims, 7 Drawing Sheets

STATIC MEMORY ALLOCATION IN NEURAL NETWORKS

BACKGROUND

Neural networks enable various machine learning techniques with a wide variety of applications, including processing visual input and categorizing textual data. Neural networks can range in complexity, from a single hidden layer with a simple activation function and relatively few neurons, to dozens of hidden layers and hundreds of neurons all affected by complicated schemes of weights and biases and back-propagation algorithms. Neural networks may be represented as a directed acyclic graph, and each node may represent a linear algebra operation. Each node may result in an activation that outputs a respective tensor, and each tensor may be a multi-dimensional matrix that represents the output of the linear algebra operation.

Traditional machine learning frameworks typically use dynamic memory allocations (e.g., malloc/free) to allocate memory for tensor activations. In dynamic memory allocation, the memory is allocated while the neural network is being executed. This approach, however, is suboptimal as it may lead to memory fragmentation. For example, fragmentation may occur when an early activation is allocated to a location that prevents efficient allocation of future activations. Also, dynamic memory allocation may require large amounts of processing power and may slow down performance of the neural network.

SUMMARY

As will be described in greater detail below, the instant disclosure describes methods and systems for static memory allocation in neural networks, in which memory for tensor activations may be allocated during the compilation phase and before execution of the neural network.

The disclosed computer-implemented method may include compiling a neural network via organizing, assigning, and allocating steps. The organizing step may include organizing an interconnected set of nodes in a series of layers. The assigning step may include assigning, for each node in each layer, an associated activation of a plurality of activations, and each activation may output a respective tensor of a plurality of tensors. The allocating step may include allocating memory for the activations by determining a respective memory size for each activation, and based on the respective memory size for each activation, assigning a memory block in the neural network to the activation. The method may further include, after the step of allocating the memory for the activations, accessing the memory blocks to perform the plurality of activations during execution of the neural network. Various other methods, systems, and computer-readable media are also disclosed.

In some embodiments, allocating the memory for the activations may include identifying groups of activations, and each group of activations may include a plurality of activations that are executed simultaneously in the neural network. Allocating the memory may further include assigning, for each group of activations, a respective memory block to each of the plurality of activations such that the plurality of activations fit together in a memory pool of the neural network.

In some embodiments, allocating the memory for the activations may include (1) identifying a first, a second, and a third activation that will be executed simultaneously in the neural network and (2) determining a respective a memory size for each of the first, second, and third activations. Based on determining that the first, second, and third activations will be executed simultaneously, the allocating step may include assigning respective first, second, and third memory blocks to the first, second, and third activations such that the first, second, and third activations fit together in a memory pool of the neural network. Allocating the memory may further include (1) determining that a fourth activation will be executed after the execution of the first, second, and third activations and (2) assigning at least a portion of at least one of the first, second, or third memory blocks to the fourth activation.

In some embodiments, for each node, the activation may be a linear algebra operation and the respective tensor may be a multi-dimensional matrix that represents an output of the linear algebra operation.

In some embodiments, executing the neural network may be performed after completion of the allocating memory for the activations. In some embodiments, allocating memory for the activations may be performed after completion of assigning the associated activation for each node.

In addition, a corresponding system may include several modules stored in memory, including a compilation subsystem and an execution subsystem. The compilation subsystem may be configured to compile a neural network, and the compilation subsystem may include an organizing module, an assigning module, and a memory allocator. The organizing module may be configured to organize an interconnected set of nodes in a series of layers. The assigning module may be configured to assign, for each node in each layer, an associated activation of a plurality of activations. Each activation may output a respective tensor of a plurality of tensors. The memory allocator may be configured to (1) allocate memory for the activations by determining a respective memory size for each activation, and based on the respective memory size for each activation, (2) assign a memory block in the neural network to the activation. The execution subsystem may be configured to, after the memory allocator allocates the memory, access the memory blocks to perform the plurality of activations and thereby execute the neural network.

In some embodiments, the memory allocator may be configured to allocate the memory for the activations by identifying groups of activations, and each group of activations may include a plurality of activations that are executed simultaneously in the neural network. The memory allocator may be configured to allocate the memory for the activations by assigning, for each group of activations, a respective memory block to each of the plurality of activations, such that the plurality of activations fit together in a memory pool of the neural network.

In some embodiments, the memory allocator may be configured to allocate the memory for the activations by identifying a first activation, a second activation, and a third activation that will be executed simultaneously in the neural network. In such embodiments, the memory allocator may also be configured to (1) determine a respective memory size for each of the first, second, and third activations, and based on determining that the first, second, and third activations will be executed simultaneously, (2) assign respective first, second, and third memory blocks to the first, second, and third activations such that the first, second, and third activations fit together in a memory pool of the neural network. The memory allocator may be configured to allocate the memory for the activations by (1) determining that a fourth activation will be executed after the execution of the first, second, and third activations and (2) assigning at least a portion of at least one of the first, second, or third memory blocks to the fourth activation.

In some embodiments, the execution subsystem may be configured to access the memory blocks after the memory allocator completes the memory allocation step for the activations. In some embodiments, the memory allocator may allocate memory for activations after the assigning module completes assigning the associated activation for each node.

In addition, a computer-readable medium may have computer-readable instructions that, when executed by at least one processor of a computing device, may cause a computing device to compile a neural network. The instructions may cause the computing device to compile the neural network by organizing, assigning, and allocating memory. In the organizing step, the instructions may cause the computing device to organize an interconnected set of nodes in a series of layers. In the assigning step, the instructions may cause the computing device to assign, for each node in each layer, an associated activation of a plurality of activations, where each activation may output a respective tensor of a plurality of tensors. In allocating memory, the instructions may cause the computing device to (1) allocate memory for the activations by determining a respective memory size for each activation, and based on the respective memory size for each activation, (2) assign a memory block in the neural network to the activation. After the computing device allocates the memory for the activations, the instructions may cause the computing device to access the memory blocks to perform the plurality of activations and thereby execute the neural network.

In some embodiments, the instructions may cause the computing device to allocate the memory for the activations by identifying groups of activations, and each group of activations may include a plurality of activations that are executed simultaneously in the neural network. The instructions may cause the computing device to allocate the memory for the activations by assigning, for each group of activations, a respective memory block to each of the plurality of activations, such that the plurality of activations fit together in a memory pool of the neural network.

In some embodiments, the instructions may cause the computing device to allocate the memory for the activations by (1) identifying a first activation, a second activation, and a third activation that will be executed simultaneously in the neural network, (2) determining a respective memory size for each of the first, second, and third activations, and based on determining that the first, second, and third activations will be executed simultaneously, (3) assigning respective first, second, and third memory blocks to the first, second, and third activations such that the first, second, and third activations fit together simultaneously in a memory pool of the neural network. The instructions may cause the computing device to allocate the memory for the activations by (1) determining that a fourth activation will be executed after the execution of the first, second, and third activations and (2) assigning at least a portion of at least one of the first, second, or third memory blocks to the fourth activation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
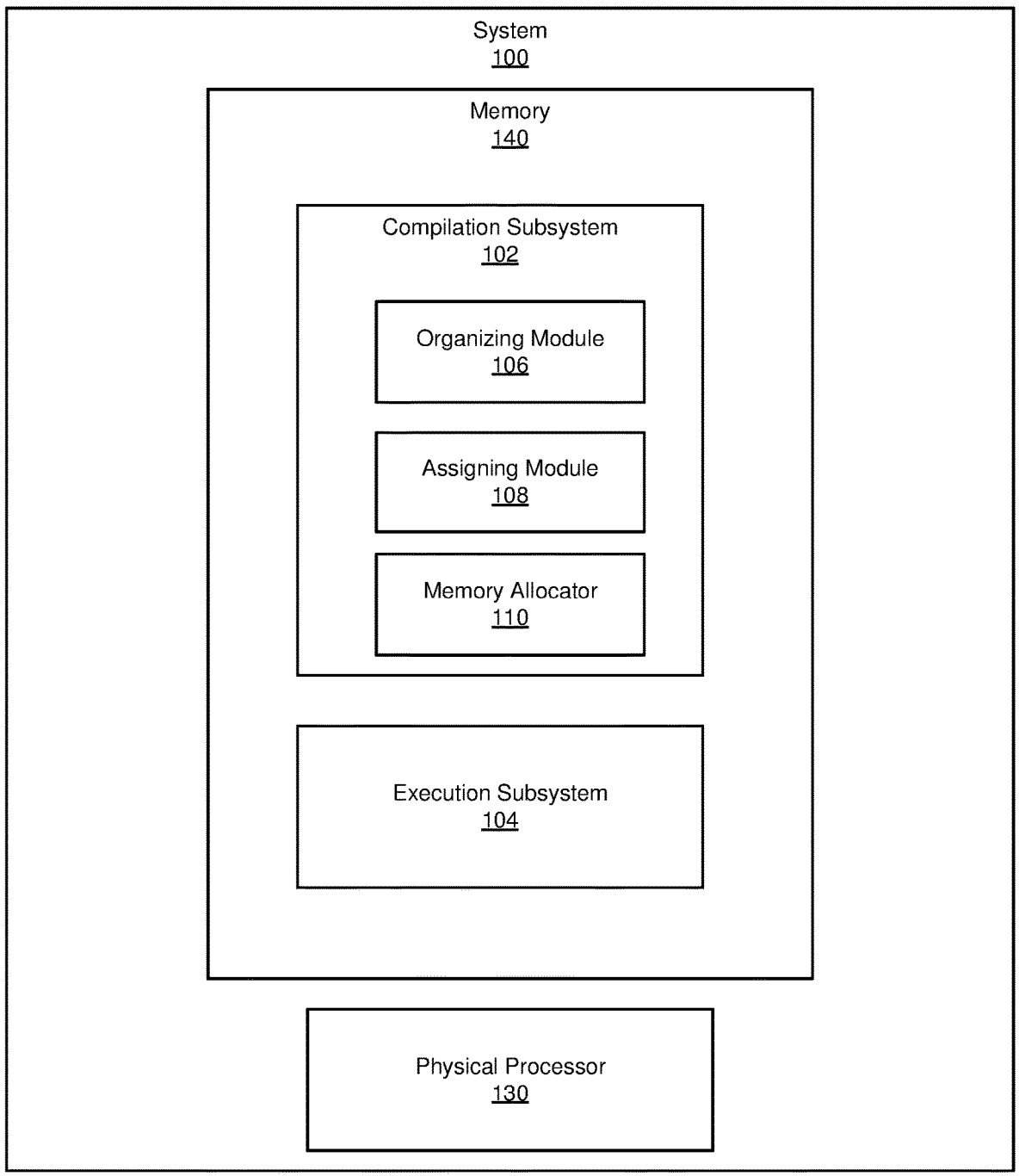
FIG. 1 is a block diagram of an exemplary computer system for compiling and executing a neural network.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for static memory allocation for tensor activations in neural networks.

A neural network may be represented as a directed acyclic graph, and each node may represent a linear algebra operation, such as a matrix multiplication or element-wise operation. These operations are typically evaluated by a machine learning framework one node at a time. Each node may be assigned an activation represented by a linear algebra equation, each activation may output a respective tensor, and each tensor may be a multi-dimensional matrix that represents the output of the linear algebra operation. The tensor, after being output by a node in one layer of the neural network, may then be consumed by another node in another layer of the neural network. Thus, the lifetime of each tensor may be bound between an outputting node that creates the tensor and a consuming node that consumes the tensor.

Traditional machine learning frameworks typically use dynamic memory allocations (e.g., malloc/free) to allocate memory for tensor activations and thus allocate the memory while the neural network is being executed. This approach, however, is suboptimal as it may lead to memory fragmentation. For example, fragmentation may occur when an early activation is assigned to a memory location that prevents efficient use of the memory location for future activations. For example, once an activation is assigned to a memory address, the activation may not be able to be moved to a different address. In cases of fragmentation, memory for an activation may be allocated in a way that divides the memory pool without consideration for leaving relatively large, contiguous sections of memory open. For example, even if the memory size of an activation is small, if the activation is placed in a memory block that is in the middle of the buffer, this may split up the entire buffer such that the buffer is not available to store activations having larger memory sizes.

In the context of traditional computer programs that do not utilize machine learning, while fragmentation poses a risk, dynamic memory allocation may be helpful since the sequences of executions are not known until after the program has begun executing. In the context of machine learning, however, the sequences of activations may be established before the program begins executing. Thus, because the sequences of activations may be established and known ahead of execution, the disclosed systems may allocate memory for the activations before the neural network begins executing. As such, the disclosed systems may allocate memory for activations without using dynamic allocation techniques (e.g., malloc/free), and may instead utilize static allocation techniques. Thus, the disclosed systems may allocate memory for activations in such a way that reduces processing requirements, increases processing speed, and reduces the risk of fragmentation.

As will be explained in greater detail below, embodiments of the instant disclosure may leverage static memory allocation to allocate memory for tensor activations in a neural network. While traditional computer programs typically use dynamic memory allocation, the instant disclosure recognizes that neural networks differ from traditional computer programs in that the entire lifetime of a neural network may be known before the neural network is executed. Thus, the described systems and methods may allocate memory for the tensors of the neural network during a compilation phase of the neural network and before execution of the neural network.

The following will provide, with reference to FIG. 1, detailed descriptions of exemplary systems for compiling and executing a neural network. Detailed descriptions of corresponding computer-implemented methods will also be provided in connection with FIGS. 2-6. Detailed descriptions of an exemplary neural network will be provided in connection with FIG. 7.

FIG. 1 is a block diagram of an exemplary computer system 100 that may be configured to compile and execute a neural network. The system 100 may include at least one physical processor 130 and a memory 140. The memory 140 may include a compilation subsystem 102 and an execution subsystem 104, and the compilation subsystem 102 may contain computer-based instruction modules (e.g., modules 106-110). In certain embodiments, one or more of the modules 106-110 or the subsystems 102, 104 may represent one or more software application or program that, when executed by the processor 130, may cause the processor 130 to perform one or more tasks (e.g., tasks for compiling and executing a neural network).

The compilation subsystem 102 may be configured to compile a neural network. In certain embodiments, the compilation subsystem 102 may be configured to compile a neural network that is static, such that the sequence of activations may be established before the neural network begins executing. In compiling the neural network, the compilation subsystem 102 may be configured to allocate memory for the activations before the neural network begins executing. For example, the compilation subsystem 102 may be configured to assign a memory block to each activation and thus allocate memory for activations while compiling the neural network.

Figure 7:
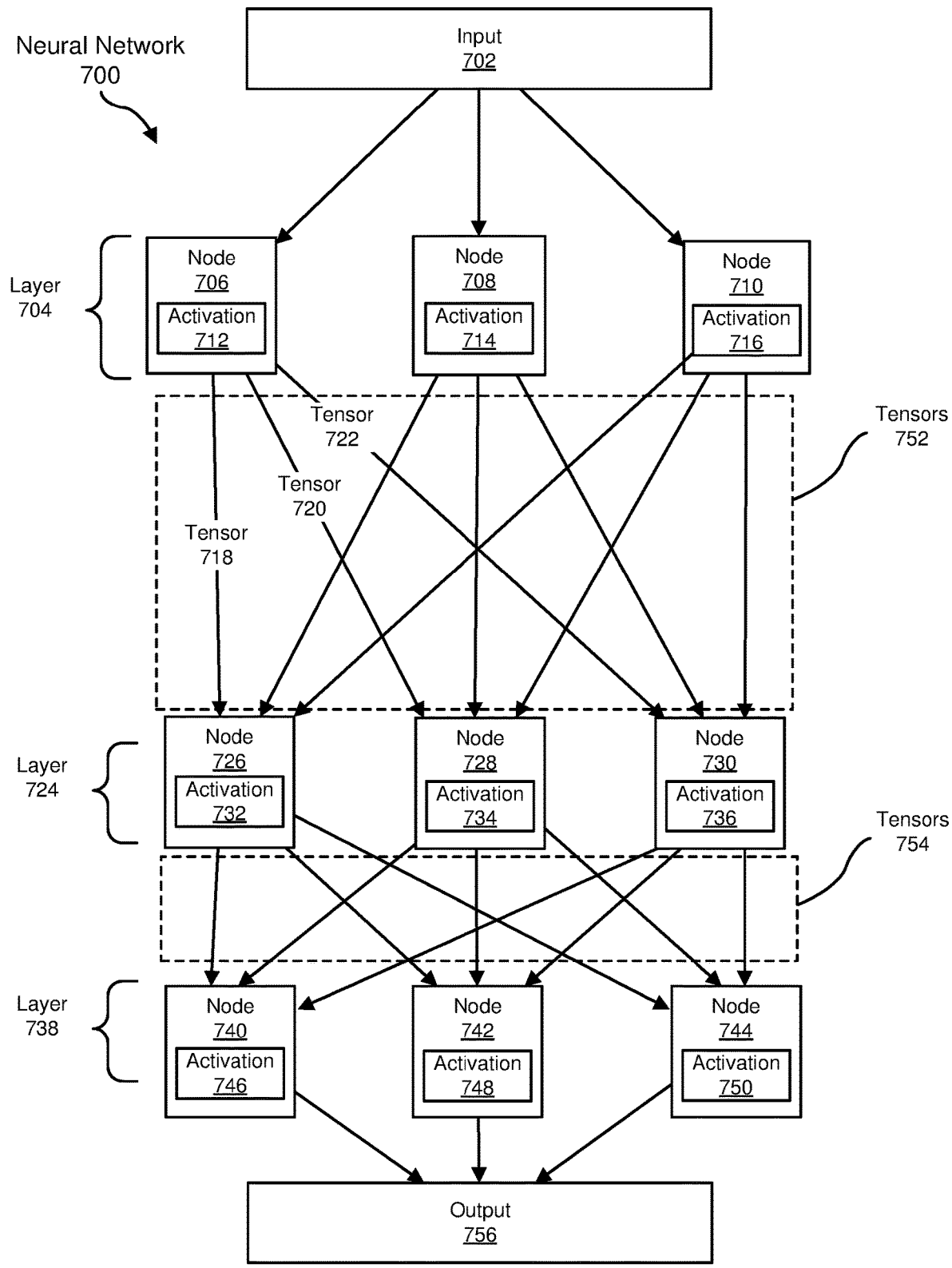
FIG. 7 is a block diagram of an exemplary neural network.

The compilation subsystem 102 may contain computer software modules for compiling a neural network. In certain embodiments, the compilation subsystem 102 may include an organizing module 106, an assigning module 108, and a memory allocator 110. The organizing module 106 may be configured to organize an interconnected set of nodes in a series of layers, for example, as shown in FIG. 7. The assigning module 108 may be configured to assign, to each node in each layer, an associated activation of a plurality of activations. Each activation may be a linear algebra operation, such as a matrix multiplication operation. Each activation may output a respective tensor of a plurality of tensors, and each tensor may be a multi-dimensional matrix that represents an output of a respective linear algebra operation.

The memory allocator 110 may be configured to allocate memory for the activations. In certain embodiments, the memory allocator 110 may allocate the memory for the activations in a static manner, for example, without utilizing dynamic allocation techniques such as malloc/free. For example, before execution of the neural network, the memory allocator 110 may assess the respective memory sizes of the activations and the available memory in the neural network and may perform static memory allocation for the activations accordingly. In some embodiments, the memory allocator 110 may determine a respective memory size for each activation, and based on the respective memory size, assign a memory block in the neural network to the activation. For example, for each activation, the memory allocator may determine a memory address indicating the beginning of a memory block assigned to the activation. In certain embodiments, the memory allocator 110 may be configured to allocate the memory for the activations before the execution subsystem 104 executes the neural network.

The execution subsystem 104 may be configured to access the memory blocks to perform the activations and thereby execute the neural network. In some embodiments, the execution subsystem 104 may be configured to execute the neural network after the compilation subsystem 102 compiles the neural network. In some embodiments, the execution subsystem 104 may be configured to begin executing the neural network after the compilation subsystem 102 completes allocating memory for the activations. For example, the execution subsystem 104 may be configured to begin executing the neural network after the memory allocator 110 completes assigning a memory block to each activation.

In some embodiments, the entire lifetime of the neural network may be established before the memory allocator 110 allocates the memory for the activations. In some embodiments, the memory allocator 110 may be configured to allocate memory for the activations after the assigning module 108 has completed assigning the associated activation to each node. For example, the memory allocator 110 may be configured to begin assigning a memory block to each activation after the assigning module 108 has assigned an associated activation to each node.

In certain embodiments, the memory allocator 110 may leverage a static nature of a neural network to allocate memory for the activations with improved efficiency. For example, the memory allocator 110 may be configured to reuse memory blocks for a series of activations of the neural network. For instance, after a particular activation has been executed, the memory block assigned to the activation may be reused for a subsequent activation. Thus, in allocating the memory, the memory allocator 110 may assign a memory block to two or more activations, so long as the two or more activations will be executed at different times throughout execution of the neural network. For example, as described in further detail below with respect to FIG. 5, the memory allocator 110 may determine groups of activations that will be executed at various times and allocate memory based on the groups. The disclosed system 100 may provide efficient allocation and reuse of memory blocks while minimizing the risk of fragmentation.

In some embodiments, the memory allocator 110 may utilize suitable approximations to the classic "bin packing" problem to allocate the memory for the activations. For example, in the classic bin packing problem, items of different volumes may be packed into a finite number of bins or containers each of volume V, such that the total volume of items in each bin does not exceed V, and the number of bins used is at a minimum. The bin packing problem has various applications, from loading shipping trucks to improving data management. To find optimal solutions to the bin packing problem, approximation algorithms have been formulated, including "first fit" and "best fit" strategies. In implementing a first fit approximation algorithm, items may be assigned to a bin in a particular given order. The algorithm may place as many possible items into a first bin, and when an item cannot fit into the first bin, then it may be placed into an additional bin. If no additional bin can be found that will fit the item, then a new bin may be created. The process may then be repeated for the rest of the items. The best fit strategy is similar to the first fit strategy, but the algorithm may place an item into a first bin that has the smallest size to accommodate the item (e.g., the algorithm may find the "tightest fit" for the item).

Figure 2:
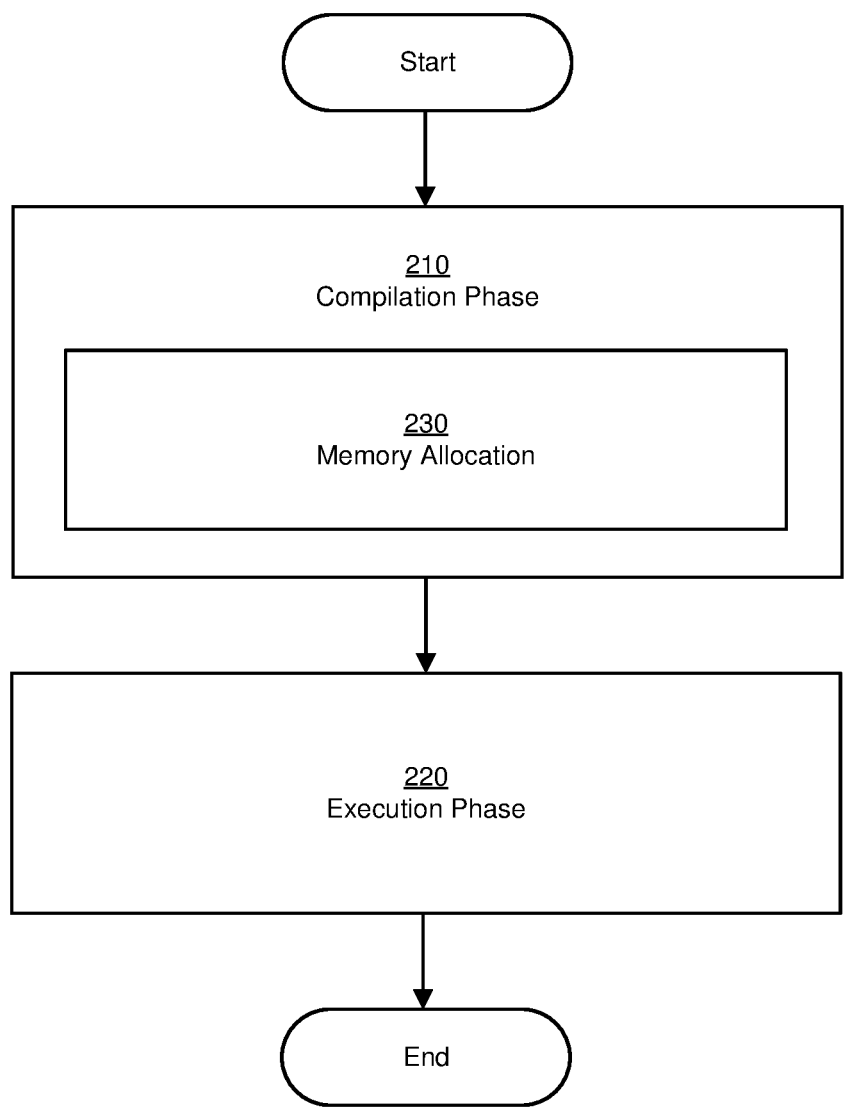
FIG. 2 is a flow diagram of an exemplary method for compiling and executing a neural network.

FIG. 2 is a flow diagram of an exemplary computer-implemented method 200 for compiling and executing a neural network. The steps shown in FIG. 2 may be performed by any suitable computer-executable code and/or computing system, including the system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, the method 200 may include a compilation phase 210 and an execution phase 220. In certain embodiments, the systems described herein may perform steps for compiling a neural network during the compilation phase 210 and may perform steps for executing the neural network during the execution phase 220. In certain embodiments, the compilation subsystem 102 may perform the compilation phase 210, and the execution subsystem 104 may perform the execution phase 220. During the compilation phase 210, the compilation subsystem 102 may organize an interconnected set of nodes in a series of layers, and assign, to each node, an associated activation, in which each activation outputs a tensor. Also during the compilation phase, the compilation subsystem 102 may, at step 230, allocate memory for the activations. For example, the compilation subsystem 102 may include a memory allocator 110 for performing memory allocation 230 for the activations. During the execution phase 220, the execution subsystem 104 may access the memory blocks to perform the activations and thereby execute the neural network. For example, the execution subsystem 104 may take an input and produce an output via the layers of interconnected nodes, for example, by performing the sequence of activations for the nodes. In some embodiments, the systems described herein may perform memory allocation 230 of the activations during the compilation phase 210 only and may refrain from allocating memory during the execution phase 220.

Figure 3:
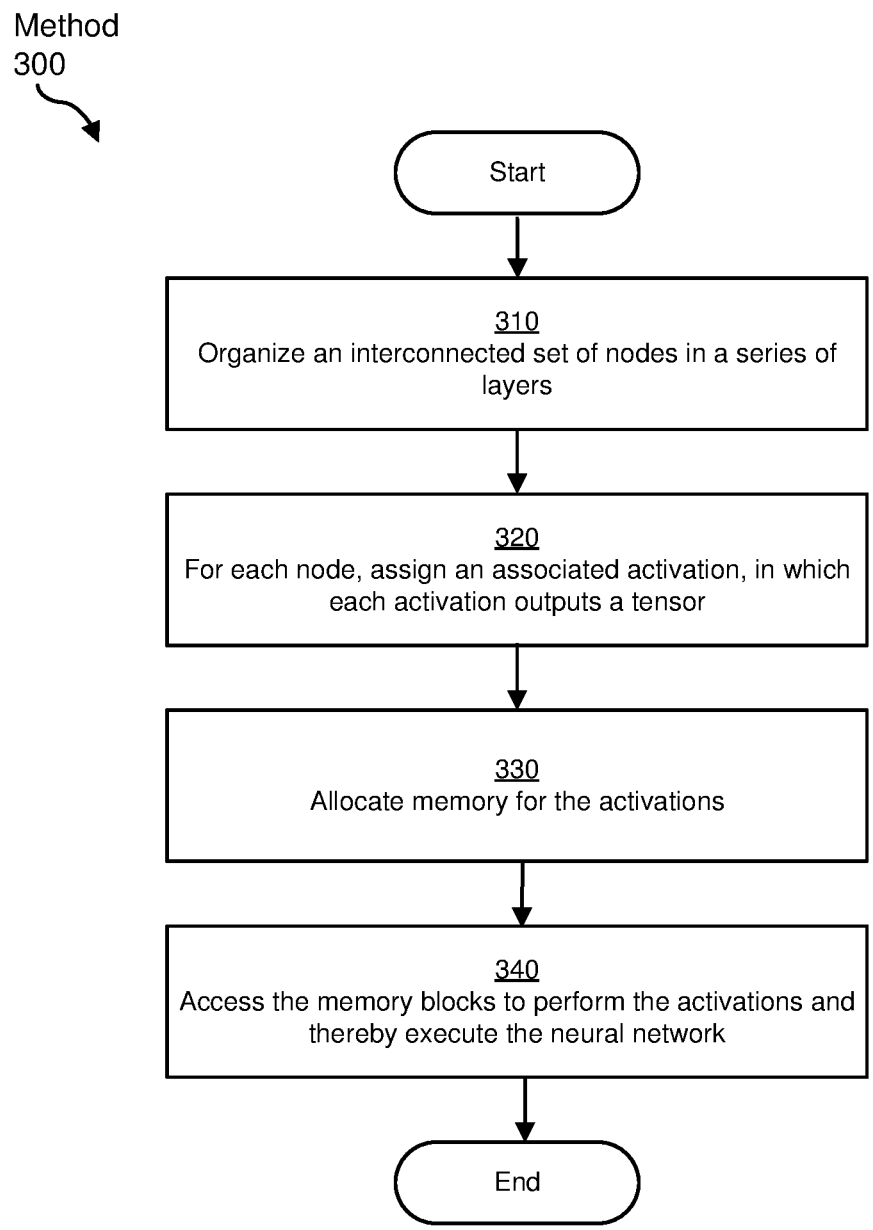
FIG. 3 is a flow diagram of an exemplary method for compiling and executing a neural network.

FIG. 3 is a flow diagram of an exemplary computer-implemented method 300 for compiling and executing a neural network. The steps shown in FIG. 3 may be performed by any suitable computer-executable code and/or computing system, including the system 100 illustrated in FIG. 1. In one example, each of the steps shown in FIG. 3 may represent an algorithm whose structure includes and/or is represented by multiple sub-steps, examples of which will be provided in greater detail below.

At step 310, the systems described herein may organize an interconnected set of nodes in a series of layers. Each node may include a mathematical function that represents an artificial neuron within a neural network. Organizing the layers of nodes may be performed in a number of suitable ways. In some embodiments, the systems described herein may build and organize the layers of nodes of the neural network based on a particular algorithm. In organizing the layers, the systems described herein may consider memory usage. For example, the systems described herein may organize the layers of nodes in such a way that conserves memory usage.

At step 320, the systems described herein may assign, to each node, an associated activation, in which each activation outputs a respective tensor of a plurality of tensors. In certain embodiments, each activation may be a linear algebra operation, and the respective tensor may be a multi-dimensional matrix that represents an output of the linear algebra operation. The neural network may be static, and activations may be assigned to the nodes by evaluating the entire lifetime of the neural network as a whole. In some embodiments, the systems described herein may assign the activations to the nodes of the neural network based on a particular algorithm. In assigning the activations, the systems described herein may consider memory usage, for example, by assigning the activations to the nodes in such a way that conserves memory usage.

At step 330, the systems described herein may allocate memory for the activations. For example, the systems described herein may assess the respective memory sizes of the activations and the available memory in the neural network, and allocate memory for the activations accordingly. Further details of exemplary methods of allocating memory 330 are described below with reference to FIGS. 4-6.

At step 340, the systems described herein may access the memory blocks to perform the activations and thereby execute the neural network. For example, in executing the neural network, the systems described herein may take an input and produce an output by performing the sequence of activations assigned to the nodes. In some embodiments, the nodes may receive inputs from nodes in the other layers, apply respective activation functions to the inputs, and send the respective results (tensors) to nodes in different layers. The systems described herein may perform step 340 after performing steps 310, 320, and 330. For example, with reference to FIGS. 2 and 3, the compilation phase 210 shown in FIG. 2 may be comprised of steps 310, 320, and 330 shown in FIG. 3, while the execution phase 220 shown in FIG. 2 may be comprised of step 340 shown in FIG. 3.

Figure 4:
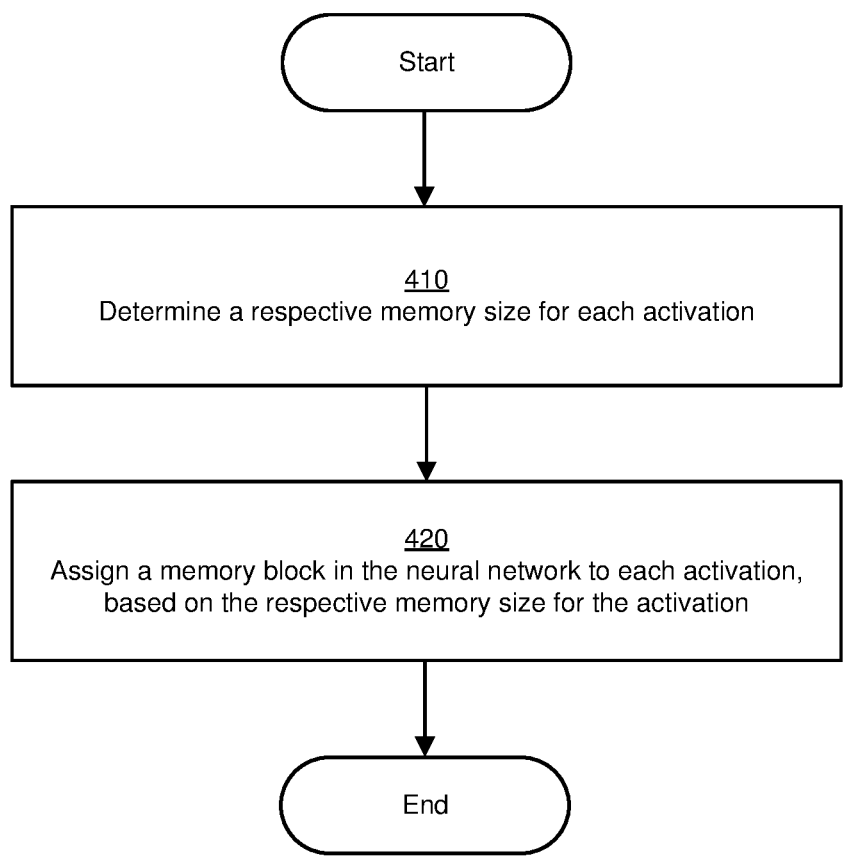
FIG. 4 is a flow diagram of an exemplary method for allocating memory for activations in a neural network.

FIG. 4 is a flow diagram of an exemplary computer-implemented method 400 for allocating memory for the activations. The steps shown in FIG. 4 may be performed by any suitable computer-executable code and/or computing system, including the system 100 (e.g., memory allocator 110) illustrated in FIG. 1. In one example, each of the steps shown in FIG. 4 may represent an algorithm whose structure includes and/or is represented by multiple sub-steps, examples of which will be provided in greater detail below.

At step 410, the systems described herein may determine a respective memory size for each activation of a plurality of activations. The systems described herein may determine the respective memory sizes for the activations in a number of suitable ways. In some examples, the systems described herein may evaluate a node having an assigned activation and may measure the memory size of the activation. In some examples, an activation may have a data tag that indicates the memory size of the activation, and in such examples the systems may determine the memory size for the activation by reading the respective data tag. In some embodiments, in determining the respective memory sizes, the systems described herein may create and maintain a list of activations and their respective memory sizes. In some embodiments, the systems may keep track of an aggregate memory size for a group of activations. At step 420, the systems described herein may assign a memory block in the neural network to each activation of the plurality of activations, based on the respective memory size for the activation.

The systems described herein may assign the memory blocks in a variety of suitable ways. In certain embodiments, the systems described herein may calculate a static memory allocation. For example, the systems described herein may determine how to fit the activations of different memory sizes into a finite number of memory blocks, each having block size B, within a memory pool of the neural network, such that the total memory size of the activations in each memory block does exceed B, and the number of memory blocks used is a minimum. In some embodiments, calculating the static memory allocation may be a nondeterministic problem, and may fall into the category of computer science algorithms known as NP-complete (nondeterministic polynomial) problems. While the calculations of NP-complete problems may be non-polynomial and difficult to solve, the systems described herein may calculate the static memory allocation by using approximation algorithms. For example, the systems described herein may be configured to use various suitable approximation algorithms (e.g., first fit, best fit, etc.) as described above with reference to FIG. 1. In certain embodiments, the neural network may be static, and the systems described herein may establish the sequence of activations in the neural network (e.g., the entire sequence of activations in the neural network) before execution of the neural network. The disclosed systems may thus allocate memory for the activations after assigning the activations to the nodes and before executing the neural network. Thus, the disclosed systems may allocate memory for the activations with improved efficiency and minimal fragmentation.

Figure 5:
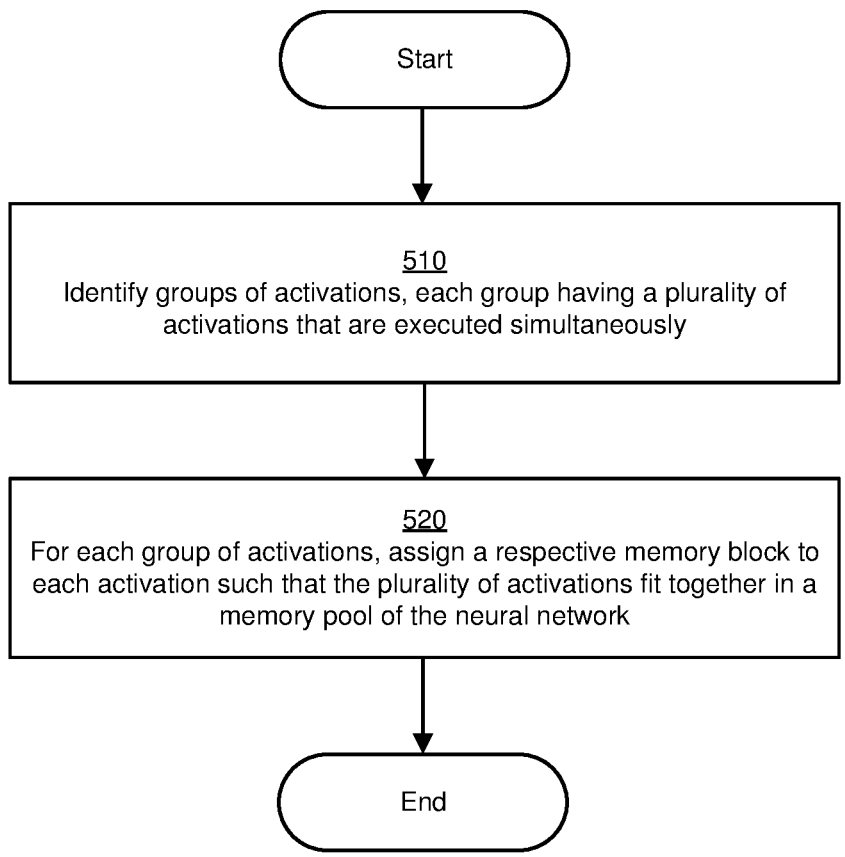
FIG. 5 is a flow diagram of an exemplary method for allocating memory for activations in a neural network.

FIG. 5 is a flow diagram of an exemplary computer-implemented method 500 for allocating memory for the activations. The steps shown in FIG. 5 may be performed by any suitable computer-executable code and/or computing system, including the system 100 (e.g., memory allocator 110) illustrated in FIG. 1. In one example, each of the steps shown in FIG. 5 may represent an algorithm whose structure includes and/or is represented by multiple sub-steps, examples of which will be provided in greater detail below.

At step 510, the systems described herein may identify groups of activations. The activations may be grouped in any suitable manner. In some embodiments, each group of activations may include a plurality of activations that are executed simultaneously in the neural network. For example, a group of activations may include a plurality of activations assigned to a plurality of nodes that are organized in a particular layer of the series of layers.

At step 520, the systems described herein may assign, for each group of activations, a respective memory block to each of the plurality of activations, such that the plurality of activations fit together in a memory pool of the neural network. The systems may assign a respective memory block in a variety of ways. In some embodiments, the systems may determine a memory size for each activation in the group of activations and may calculate an aggregate memory size for the group of activations (e.g., by adding together the memory sizes for the activations in the group). The systems may assign a memory block in the neural network to each activation in the group based on the respective memory size for the activation and the aggregate memory size for the group. The systems may establish a group of memory blocks in the neural network for the group of activations, and may determine how to fit the activations of different memory sizes into the group of memory blocks. Each memory block may have a block size B, and the system may determine how to fit the activations in the memory blocks such that the total memory size of the activations in each memory block does not exceed B, and the number of memory blocks used is a minimum.

Figure 6:
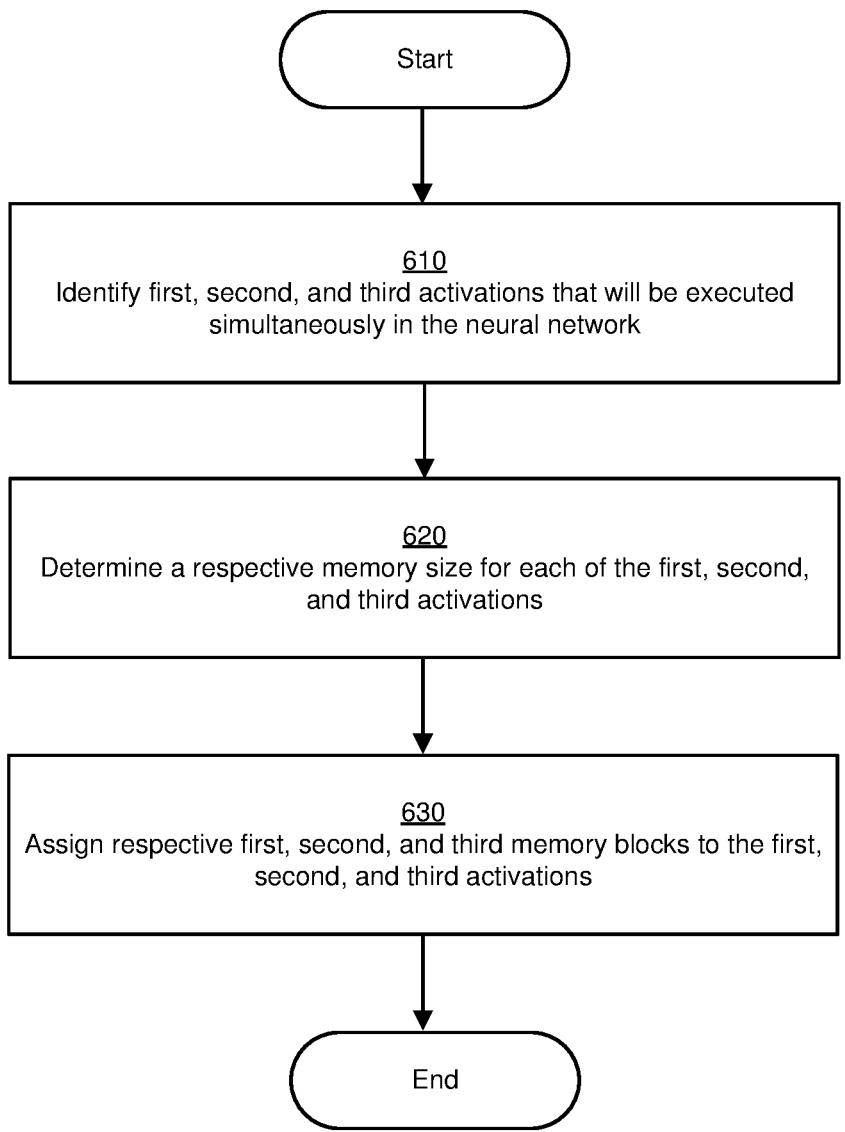
FIG. 6 is a flow diagram of an exemplary method for allocating memory for activations in a neural network.

FIG. 6 is a flow diagram of an exemplary computer-implemented method 600 for allocating memory for the activations. The steps shown in FIG. 6 may be performed by any suitable computer-executable code and/or computing system, including the system 100 (e.g., memory allocator 110) illustrated in FIG. 1. In one example, each of the steps shown in FIG. 6 may represent an algorithm whose structure includes and/or is represented by multiple sub-steps, examples of which will be provided in greater detail below.

At step 610, the systems described herein may identify a first activation, a second activation, and a third activation that will be executed simultaneously in the neural network. In some examples, the activations may each have a data tag indicating a respective location in time within the neural network. The systems may read the data tags and may group activations together that have data tags indicating a same location in time within the neural network.

At step 620, the systems described herein may determine a respective memory size for each of the first, second, and third activations. The systems described herein may determine the respective memory sizes for the first, second, and third activations in a number of suitable ways. For example, as described above with reference to FIG. 3, in some examples, the systems described herein may measure the memory sizes of the activations. In some embodiments, the systems may determine the memory sizes for the activations by reading respective data tags indicative of the memory size. Also, in some embodiments, the systems described herein may create and maintain a list that keeps tracks of an aggregate memory size for the first, second, and third activations (e.g., by adding together the memory sizes of the first, second, and third activations). At step 630, based on determining that the first, second, and third activations will be executed simultaneously, the systems described herein may assign respective first, second, and third memory blocks to the first, second, and third activations, such that the first, second, and third activations fit together in a memory pool for the neural network. The systems may assign a respective memory block in the neural network to each of the first, second, and third activations, based on the respective memory size for the activation and the aggregate memory size for the group of activations. For example, as described above with reference to FIG. 5, each memory block may have a block size B, and the system may determine how to fit the first, second, and third activations in the memory blocks such that the total memory size of the activations in each memory block does not exceed B and the number of memory blocks used is a minimum.

In some embodiments, the neural network may be static, and the order of activations for the entire neural network may be established before the neural network is executed. Upon the systems identifying a first group of activations that will be executed simultaneously (e.g., first, second, and third activations), the systems may identify a second group of activations that will be executed simultaneously (e.g., fourth, fifth, and sixth activations) and that will be executed after the first group. In some embodiments, the systems described herein may assign respective fourth, fifth, and sixth memory blocks to the fourth, fifth, and sixth activations, such that the fourth, fifth, and sixth activations fit together in a memory pool for the neural network. In some embodiments, upon determining that the fourth activation will be executed after the execution of the first, second, and third activations, the systems descried herein may reassign at least a portion of at least one of the first, second, or third memory blocks to the fourth activation. For example, as the execution of each activation may free up the respective memory block to which the activation was assigned, memory blocks may be reused for subsequent activations. In some examples, upon determining that the fourth, fifth, and sixth activation will be executed after the execution of the first, second, and third activations, the systems descried herein may reassign at least a portion of at least one of the first, second, or third memory blocks to the fourth, fifth, and sixth activations.

It should be understood that the description of three activations (e.g., first, second, and third activations) in a group is exemplary, and there may be any suitable number of activations in a group of activations (e.g., any suitable number of activations may execute simultaneously in the neural network). The systems may establish further groups based on further sequences of activations in the neural network. For example, the systems may establish a third group of activations (e.g., seventh and eighth activations) that will be executed simultaneously after the second group of activations, and the systems may allocate memory for the third group of activations in a manner similarly to that described above with reference to the first and second groups of activations. The systems may establish groups of activations for all of the activations in the neural network, and may allocate the memory for each of the groups accordingly.

FIG. 7 is a block diagram of an exemplary neural network 700. The neural network 700 may take in an input 702 and produce an output 756 via layers 704, 724, 738. In some embodiments, layer 704 may include nodes 706, 708, 710 that may be configured with activations 712, 714, 716, respectively. Layer 724 may include nodes 726, 728, 730 that may be configured with activations 732, 734, 736 respectively. Layer 738 may include nodes 740, 742, 744 that may be configured with activations 746, 748, 750, respectively.

In certain embodiments, activations in a layer may output tensors and the tensors may be consumed by activations in another layer. For example, activations 712, 714, 716 of nodes 706, 708, 710 may output tensors 752, and the tensors 752 may be consumed by activations 732, 734, 736 of nodes 726, 728, 730. Also, activations 732, 734, 736 of nodes 726, 728, 730 may output tensors 754, and the tensors 754 may be consumed by activations 746, 748, 750 of nodes 740, 742, 744.

In some embodiments, tensors sent by the nodes in layer 704 to the nodes in layer 724 may be weighted using weights. For example, tensor 718 sent from node 706 to node 726 may be weighted with a first weight value, and tensor 720 sent from node 706 to node 728 may be weighted with a second weight value, and/or tensor 722 sent from node 706 to node 730 may be weighted with a third weight value. Similarly, tensors sent from each of the other nodes in layer 704 to each node in layer 724 may have individual weights. In some embodiments, tensors sent by the nodes in layer 724 to the nodes in the layer 738 may be weighted with weights.

The disclosed systems and methods may leverage the static properties of neural networks to provide a memory allocation technique that reduces processing requirements, increases processing speed, and reduces the risk of fragmentation.

The term "neural network," as used herein, generally refers to any physical or virtual computing system that contains a collection of connected nodes. In some embodiments, nodes may be organized into layers and may be connected to some or all nodes in adjacent layers. In some embodiments, the connections between nodes may be regulated by a weight that the information from the sending node is given by the receiving node. In one embodiment, weights, and therefore the organization of and connections between nodes, may be represented as numerical data stored in a set of matrices. In some examples, weights may be integers, while in other examples, weights may include non-integer values.

The term "node," as used herein, generally refers to a mathematical function that represents an artificial neuron within a neural network. In some embodiments, a node may receive one or more inputs from nodes in another layer, apply an activation function to the input, and send the result to one or more additional nodes in a different layer. In some embodiments, a node may also receive input in the form of a bias, a static term that is added to all output produced by the node. In some examples, a bias may be used to perform an affine transformation on data produced by the node and/or the neural network. In some embodiments, all nodes within the same layer may have the same bias. In one embodiment, bias information for a layer of nodes may be stored alongside weight information for the layer of nodes.

In some examples, a neural network may be a convolutional neural network. A convolutional neural network is a type of neural network typically applied to analyzing visual data that include a mix of convolutional, pooling, and/or fully connected layers. A fully connected layer is a layer where each node in the layer is connected to each other node in each of the adjacent layers. By contrast, a convolutional layer contains nodes that are only connected to a subset of the nodes in the previous layer. For example, a convolutional layer that is connected to a layer containing 2,000 nodes may contain nodes that are each connected to a four by four square containing sixteen nodes in the previous layer. Pooling layers contain nodes that combine inputs from a cluster of nodes in the previous layer. In some examples, a pooling layer may use the maximum value from the cluster of nodes, while in other examples a pooling layer may use the average value. In some embodiments, the plurality of matrices may include bias and weight information for nodes that are part of fully-connected layers within the set of layers and/or filter and bias information for nodes that are part of convolution layers within the set of layers. In some examples, a convolutional neural network may process visual input by dividing the visual input into subsets and processing each subset with a different subset of nodes within the interconnected set of nodes, for example by using a combination of convolution and/or pooling layers.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to assign an activation to each node and to determine a respective memory size for each activation, and use the result of the activation to assign a memory block to each activation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method comprising:
   compiling a neural network, wherein the compiling comprises:
     organizing an interconnected set of nodes in a series of layers;

for each node in each layer, assigning an associated activation of a plurality of activations, wherein each activation outputs a respective tensor of a plurality of tensors; and allocating memory for the activations by:
identifying a first activation, a second activation, and a third activation that will be executed simultaneously in the neural network;
determining a respective memory size for each activation; and
based on the respective memory size for each activation and based on determining that the first, second, and third activations will be executed simultaneously, assigning a memory block in the neural network to each activation; and after the allocating the memory for the activations, accessing the memory blocks to perform the plurality of activations and thereby execute the neural network.

2. The computer-implemented method of claim 1, wherein allocating the memory for the activations comprises identifying groups of activations, wherein each group of activations comprises a plurality of activations that are executed simultaneously in the neural network.

3. The computer-implemented method of claim 2, wherein allocating the memory for the activations further comprises, for each group of activations, assigning a respective memory block to each of the plurality of activations, such that the plurality of activations fit together in a memory pool of the neural network.

4. The computer-implemented method of claim 1, wherein allocating the memory for the activations comprises assigning respective first, second, and third memory blocks to the first, second, and third activations such that the first, second, and third activations fit together simultaneously in a memory pool of the neural network.

5. The computer-implemented method of claim 4, wherein allocating the memory for the activations further comprises:
determining that a fourth activation will be executed after execution of the first, second, and third activations; and
assigning at least a portion of at least one of the first, second, or third memory block to the fourth activation.

6. The computer-implemented method of claim 1, wherein, for each node:
the activation is a linear algebra operation; and
the respective tensor is a multi-dimensional matrix that represents an output of the linear algebra operation.

7. The computer-implemented method of claim 1, wherein executing the neural network is performed after completion of allocating the memory for the activations.

8. The computer-implemented method of claim 1, wherein allocating memory for the activations is performed after completion of assigning the associated activation to each node.

9. A system comprising:
a compilation subsystem that is configured to compile a neural network, wherein the compilation subsystem comprises:
an organizing module that is configured to organize an interconnected set of nodes in a series of layers;
an assigning module that is configured to assign, for each node in each layer, an associated activation of a plurality of activations, wherein each activation outputs a respective tensor of a plurality of tensors; and
a memory allocator that is configured to allocate memory for the activations by:
identifying a first activation, a second activation, and a third activation that will be executed simultaneously in the neural network;
determining a respective memory size for each activation; and
based on the respective memory size for each activation and based on determining that the first, second, and third activations will be executed simultaneously, assigning a memory block in the neural network to each activation; and
an execution subsystem that is configured to, after the memory allocator allocates the memory, access the memory blocks to perform the plurality of activations and thereby execute the neural network.

10. The system of claim 9, wherein the memory allocator is configured to allocate the memory for the activations by identifying groups of activations, wherein each group of activations comprises a plurality of activations that are executed simultaneously in the neural network.

11. The system of claim 10, wherein the memory allocator is configured to allocate the memory for the activations by assigning, for each group of activations, a respective memory block to each of the plurality of activations, such that the plurality of activations fit together in a memory pool of the neural network.

12. The system of claim 9, wherein the memory allocator is configured to allocate the memory for the activations by assigning respective first, second, and third memory blocks to the first, second, and third activations such that the first, second, and third activations fit together in a memory pool of the neural network.

13. The system of claim 12, wherein the memory allocator is configured to allocate the memory for the activations by:
determining that a fourth activation will be executed after execution of the first, second, and third activations; and
assigning at least a portion of at least one of the first, second, or third memory block to the fourth activation.

14. The system of claim 9, wherein the execution subsystem is configured to access the memory blocks after the memory allocator completes allocating the memory for the activations.

15. The system of claim 9, wherein the memory allocator allocates memory for activations after the assigning module completes the assigning the associated activation to each node.

16. A computer-readable medium comprising computer-readable instructions that, when executed by at least one processor of a computing device, cause the computing device to:
compile a neural network by:
organizing an interconnected set of nodes in a series of layers;
for each node in each layer, assigning an associated activation of a plurality of activations, wherein each activation outputs a respective tensor of a plurality of tensors; and
allocating memory for the activations by:
identifying a first activation, a second activation, and a third activation that will be executed simultaneously in the neural network;
determining a respective memory size for each activation; and
based on the respective memory size for each activation and based on determining that the first, second, and third activations will be executed simultaneously, assigning a memory block in the neural network to each activation; and after the allocating the memory for the activations, access the memory blocks to perform the plurality of activations and thereby execute the neural network.

17. The computer-readable medium of claim 16, wherein the instructions cause the computing device to allocate the memory for the activations by identifying groups of activations, wherein each group of activations comprises a plurality of activations that are executed simultaneously in the neural network.

18. The computer-readable medium of claim 17, wherein the instructions cause the computing device to allocate the memory for the activations by assigning, for each group of activations, a respective memory block to each of the plurality of activations, such that the plurality of activations fit together in a memory pool of the neural network.

19. The computer-readable medium of claim 16, wherein the instructions cause the computing device to allocate the memory for the activations by assigning respective first, second, and third memory blocks to the first, second, and third activations such that the first, second, and third activations fit together simultaneously in a memory pool of the neural network.

20. The computer-readable medium of claim 19, wherein the instructions cause the computing device to allocate the memory for the activations by:
   determining that a fourth activation will be executed after the execution of the first, second, and third activations; and
   assigning at least a portion of at least one of the first, second, or third memory block to the fourth activation.

* * * * *